(12) United States Patent
Raghavan et al.

(10) Patent No.: US 7,720,656 B2
(45) Date of Patent: May 18, 2010

(54) GRAPHICAL FUNCTIONS

(75) Inventors: Vijaya Raghavan, Framingham, MA (US); Jay Ryan Torgerson, Southborough, MA (US)

(73) Assignee: The Math Works, Inc., Natick, MA (US)

( * ) Notice: Subject to any disclaimer, the term of this patent is extended or adjusted under 35 U.S.C. 154(b) by 1263 days.

(21) Appl. No.: 09/855,199

(22) Filed: May 14, 2001

(65) Prior Publication Data

US 2002/0167544 A1 Nov. 14, 2002

(51) Int. Cl.
G06G 7/48 (2006.01)
G06F 9/44 (2006.01)

(52) U.S. Cl. .......................................... 703/6; 717/109
(58) Field of Classification Search ..................... 703/6, 703/2; 717/109
See application file for complete search history.

(56) References Cited

U.S. PATENT DOCUMENTS

2002/0083413 A1\* 6/2002 Kodosky et al. ............ 717/109

OTHER PUBLICATIONS

Stateflow Version 2. Mathworks. May 1999.\*
Stateflow Version 3.0 (R11) May 2000.\*
Using Real-Time Expert Systems for Control System Prototyping, Karl-Erik Arzen, Oct. 17-20, 1993.\*
"Practical Validation of Model Based Code Generation for Automotive Applications", Toeppe et al. 1999 IEEE.\*

\* cited by examiner

*Primary Examiner*—Kamini S Shah
*Assistant Examiner*—Saif A Alhija
(74) *Attorney, Agent, or Firm*—Lahive & Cockfield, LLP; Kevin J. Canning

(57) ABSTRACT

A method, system and computer program product to define and utilize functions graphically is provided which may be used in the simulation of finite state machines. The functions may combine mathematical, logical, non-linear and comparative operations. The graphical elements of the function may be hidden for ease of display of various portions of a model.

61 Claims, 8 Drawing Sheets

GRAPHICAL FUNCTIONS

COPYRIGHT NOTICE

A portion of the disclosure of this document contains material that is subject to copyright protection. The copyright owner has no objection to the facsimile reproduction by anyone of the patent document or the patent disclosure, as it appears in the Patent and Trademark Office patent file or records, but otherwise reserves all copyright works whatsoever.

TECHNICAL FIELD

This invention relates to making and using graphical representations of functions that may be invoked in a modeling system for finite state machines.

BACKGROUND

A finite state machine (FSM) is a representation of an event-driven (reactive) system. In an event-driven system, the system makes a transition from one state (mode) to another prescribed state, provided that the condition defining the change is true. For example, a state machine may be used to represent a car's automatic transmission. The transmission has a number of operating states: park, neutral, drive, reverse, and so on. The system makes a transition from one state to another when a driver shifts the stick from one position to another, for example, from park to neutral.

Designers have used truth tables to represent relationships among the inputs, outputs, and states of an FSM. The resulting table describes the logic necessary to control the behavior of the system under study. Another approach to designing event-driven systems is to model the behavior of the system by describing it in terms of transitions among states. The state that is active is determined based on the occurrence of events under certain conditions. State-transition diagrams (STDs) and bubble diagrams are graphical representations based on this approach.

Another method of modeling FSMs is to create a graphical representation (a statechart) of a finite state machine wherein states and transitions form the basic building blocks of the system.

Existing statechart systems for modeling finite state machines permit a user to embed textual definitions of functions in a statechart and invoke those functions in the statechart. In a textually defined function, the procedure performed by the function is defined by code.

BRIEF SUMMARY

In one aspect, the invention provides a method and system using a computer having a graphical user interface and defining a function within a graphical representation of a finite state machine, representing the at least one function graphically; and calling the graphical function in a modeling system. The defining may include the using a function block, which in turn may have a function prototype and also a function flow diagram. In another aspect, the representation of the function uses graphical elements. In yet another aspect, the simulation system offers a means for graphical diagramming.

In still another aspect, the invention may be implemented as a computer program product, stored in a computer readable medium, having instructions to cause a computer to receive user input defining a graphical function and use it in a simulation. In other aspects, the invention may have further instructions to use a function block, a function prototype or a function flow diagram, or combinations thereof The function flow diagram may be assembled from graphical elements.

In yet another aspect, the invention includes means for simulating a finite state machine. In still another aspect, a user may cause the flow diagram to be hidden. The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Graphical functions allow a user to use a diagram to visually represent a procedure performed by a function in a statechart system. A diagrammatic representation of the function procedure can be easier to understand and modify than a textual representation. In a statechart system which includes built-in state diagram parsing capabilities, the parser may be used to check the diagram for errors. A statechart system's diagram animation and debugging capabilities can be used to step through the graphical function to find errors.

Figure 1:
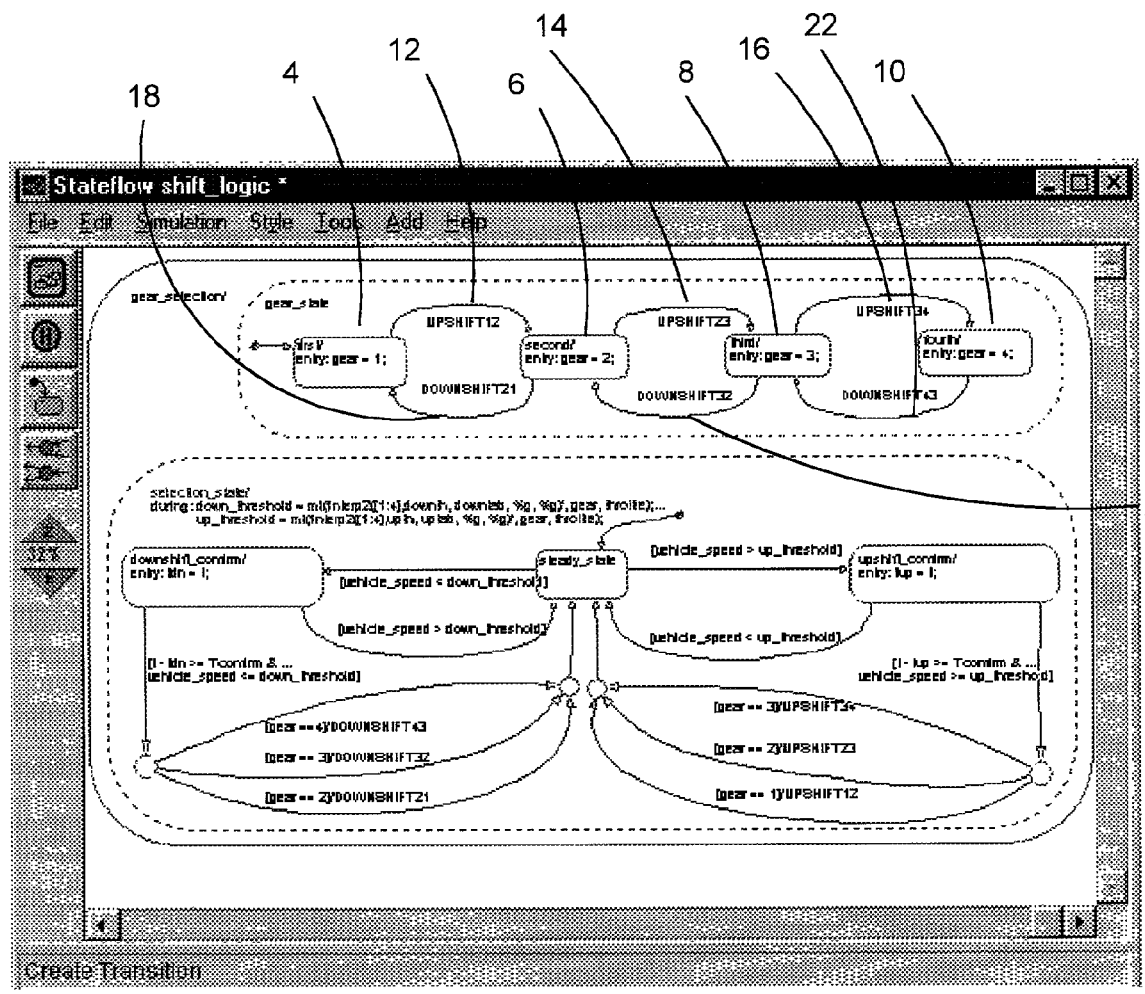
FIG. 1 is a view of prior art showing a statechart modeling system screen.

Referring to FIG. 1, an example of a simple statechart 2 is shown using Stateflow®. States 4, 6, 8 and 10 are shown with transitions 12, 14, 16, 18 20 and 22 modeling the states of an automobile transmission. The following section provides descriptions and definitions of a number of terms used in this application.

A state diagram is a graphical representation of a finite state machine where states and transitions form the basic building blocks of the system.

A state describes a mode of an event-driven system. The activity or inactivity of the states dynamically changes based on events and conditions. Each state has hierarchy. Each state may have a parent state and/or a child state. Each state has a higher hierarchy than its child state but a lower hierarchy than its parent state.

A transition is a graphical object that can link one object to another. One end of a transition is attached to a source object and the other end to a destination object. The source is where the transition begins and the destination is where the transition ends.

A connective junction is a decision point in the system. A connective junction provides an alternative way to represent desired system behavior. A connective junction is a graphical object that simplifies a state diagram representation and facilitates generation of efficient code.

A history junction provides means to specify the destination substate of a transition based on historical information. If a superstate has a history junction, the transition to the destination substate is defined to be the substate that was most recently visited. The history junction applies to the level of the hierarchy in which it appears.

A data object/item can store numerical values for reference in a state diagram. Data objects/items are nongraphical objects and are not represented in the figure of the state diagram.

A condition is a Boolean expression specifying that a transition occurs given that the specified expression is true.

A graphical function is a function defined by a flow graph. Graphical functions are similar to textual functions, such as MATLAB and C functions. Like textual functions, graphical functions can accept arguments and return results. Unlike MATLAB and C functions, graphical functions are objects that reside with the state diagram that invokes them. Graphical functions are easier to create, access, and manage than textual functions, whose creation requires external tools and whose definition resides separately from the state diagram.

Figure 2:
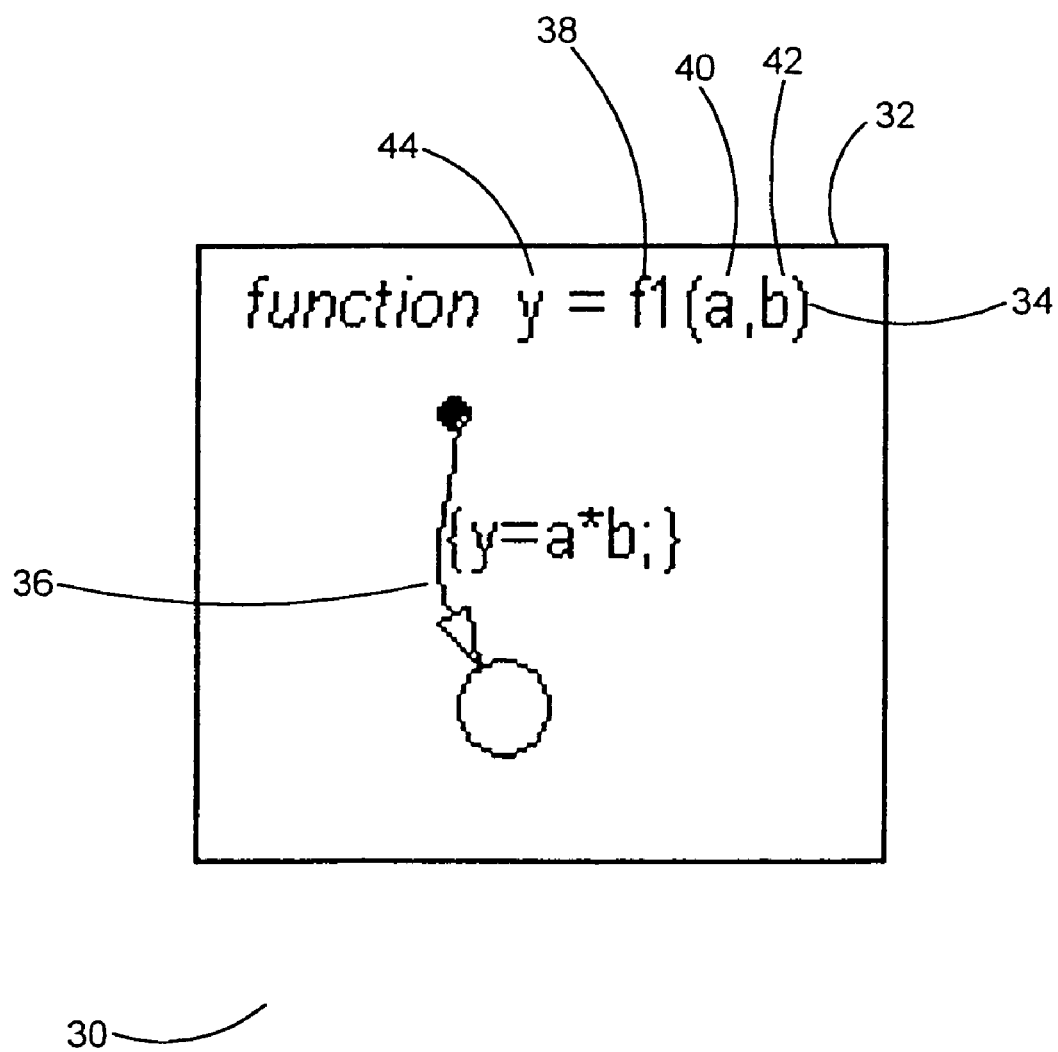
FIG. 2 is a graphical representation of a graphical function.

Referring to FIG. 2, an exemplary implementation of a graphical function 30 is shown as embodied in Stateflow®. The graphical function as shown in this embodiment includes (i) a function block 32; (ii) a function prototype 34; (iii) a function flow diagram 36; (iv) function data (not shown) and (v) scoping rules (not shown). These are more specifically described below.

A graphical function is represented in a state diagram by a function block 32. In the example embodiment, the block 32 is named "function" to distinguish it from other block-like entities, such as states, and contains two elements: a function prototype 34 and a flow diagram 36.

The function prototype 34 specifies the syntax for invoking the function in state and transition actions. In an exemplary implementation described below, it has a function name 38, a parameter list 40 listing arguments passed to the function when it is invoked, and a return parameter 44 representing a list of values returned by the function. Other structures may be used to accomplish a similar result. The number of parameters passed to the function may be any number. The number of output parameters returned by the function may be any number as well. In the described embodiment, actions that invoke a graphical function pass arguments 40 and 42 to the function in the same order that they appear in the function's parameter list; however, other argument passing schemes could also be used beneficially.

The function diagram 36 graphically defines the procedure performed by the graphical function. The function diagram 36 can by any type of diagram capable of describing a function (or procedure), including but not confined to data flow diagrams, control flow diagrams, state diagrams, etc. The function diagram can use the function's formal parameters 40 and 42 in actions performed by the flow diagram 36. Argument parameters 40 and 42 are replaced by the actual argument values when the function is invoked. The last value assigned to the return parameter 44 is returned as the function's return value.

Figure 3:
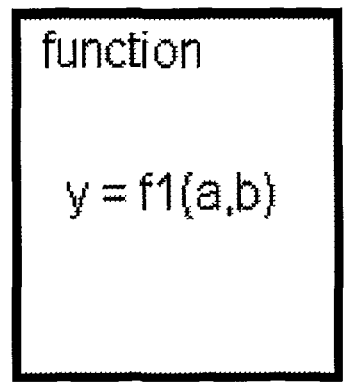
FIG. 3 is a graphical function with the contents hidden.

A diagramming system in a statechart system preferably provides some way for a user to draw the function diagram. A function diagram for a complex function can take up a lot of space. A state diagramming system can save space by allowing a user to hide the function diagram. FIG. 3 shows an example of a function block 50 with its function diagram hidden.

In the described embodiment, graphical functions use variables defined in a diagramming system's data dictionary to store intermediate results of computations. Variables that are defined within a graphical function are private to that function (and to any functions that are defined within that function), and thus need not be uniquely named in the system at large. This prevents one graphical function from overwriting the results of another function. The data dictionary approach allows a user to define special types of data items for use in functions, such as (i) Local: a local data item persists from invocation to invocation. For example, if the item is equal to 1 when the function returns from one invocation, the item will equal 1 the next time the function is invoked;

(ii) Temporary: the system initializes a new copy of a temporary item for each invocation of the function; and (iii) Constant: a constant data item retains its initial value through all invocations of the function.

(iv) Input: a data item that is an argument to the function.

(v) Output: a data item that is a value returned by the function.

A function's scope refers to the set of state diagram elements (states and transitions) that can invoke the function. In the example embodiment, the scope of a function is the scope of the state or statechart wherein it is defined statechart. The following exceptions apply:

(i) A statechart can export its functions. The functions exported by a chart can be invoked anywhere in the state machine in which the chart appears, including other charts defined in the state machine.

Figure 9:
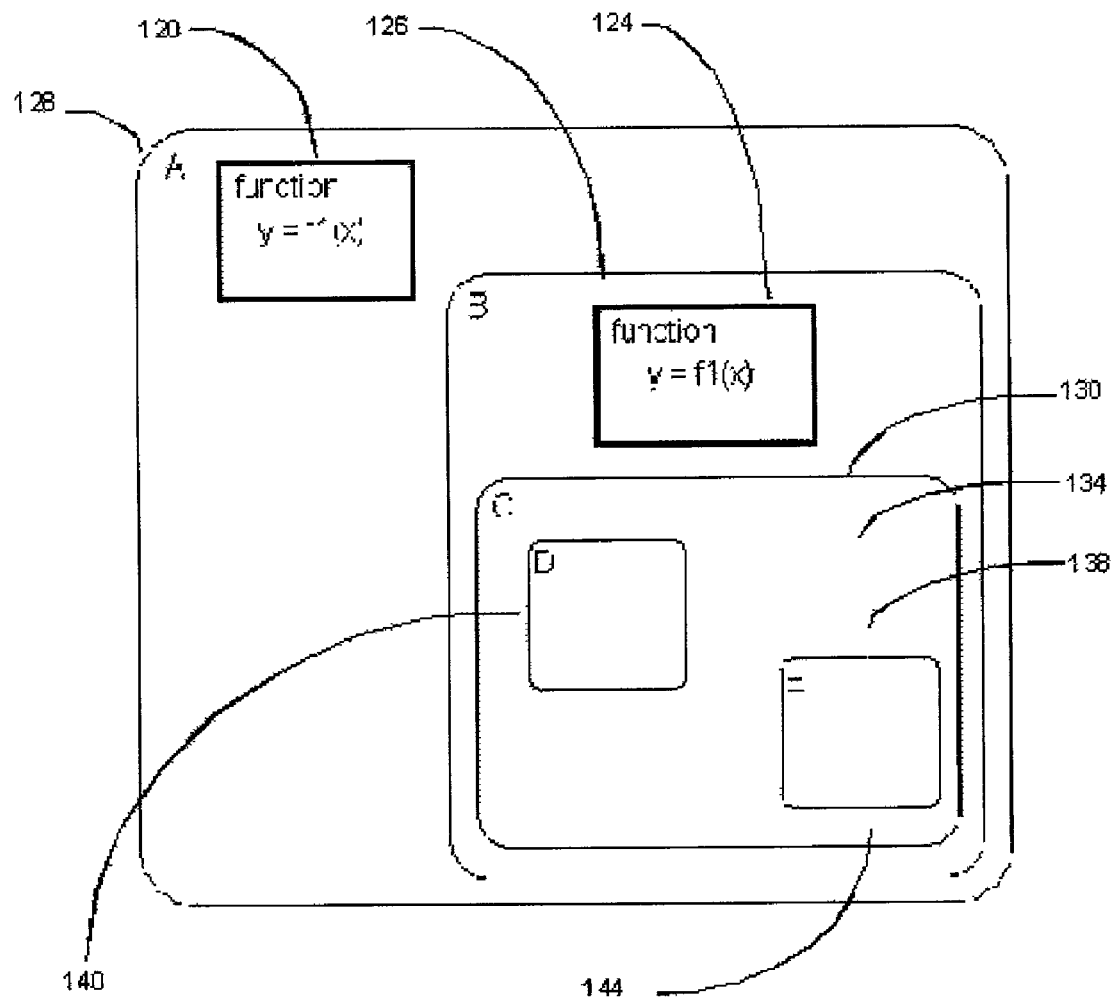
FIG. 9 shows a graphical function that shadows another graphical function.

(ii) A graphical function shadows any functions of the same name defined in ancestors of that graphical function's parent state or chart. In other words, a state or transition that invokes function A will get the version of A defined closest to it in the state diagram hierarchy. For example, FIG. 9 shows a transition condition 134 in state C 130 that invokes a graphical function name f1. The transition condition 134 is a condition of transition 138 to make a transition from state D 140 to state E 144. The chart contains two definitions of f1, one 124 defined in state B 126, the other 120 defined in state A 128. In this example, state B's definition of f1 is the definition that is invoked when transition condition 134 is evaluated in state C 130. This is because state B 126 is a more immediate ancestor of state C 130 than is state A 128.

Figure 4:
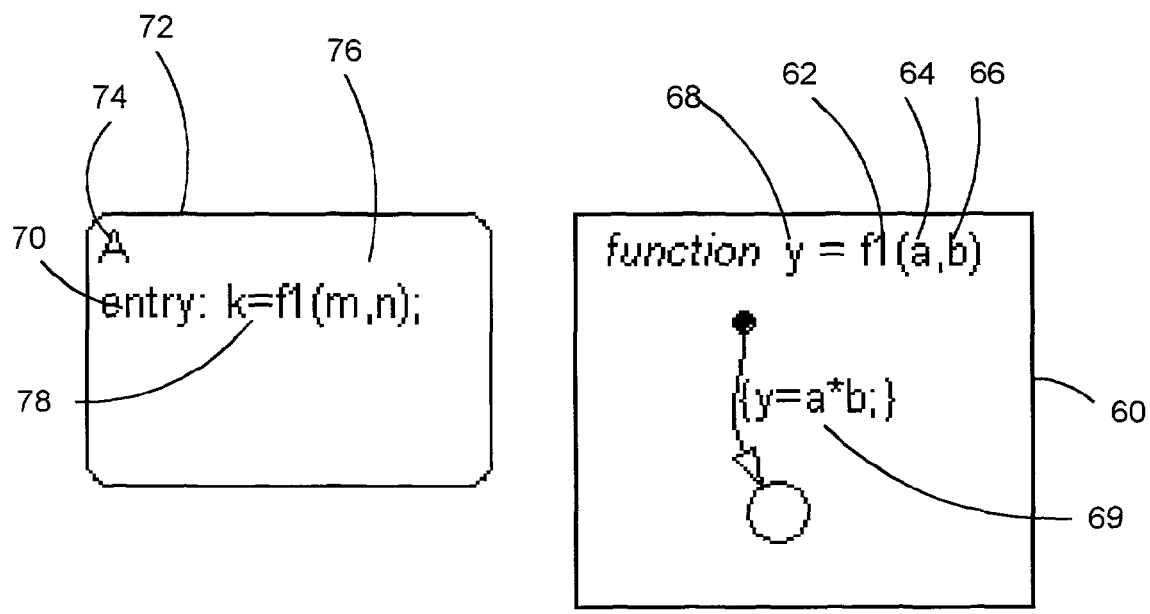
FIG. 4 is a diagram of a graphical function and an invocation of a graphical function.

A state or transition action may invoke a graphical function by replacing the formal parameters of the prototype with actual arguments and assigning the result to a variable. For example, FIG. 4 shows a defined graphical function 60 named f1 62 that multiplies its arguments 64 and 66 according to expression 69 and an invocation (call) 76 of f1 62 in the entry action 70 of a state 72 named A 74. Note that the return parameter 68 in the function prototype of f1 62 need not have the same name as the return parameter in the Invocation of the function 78.

Invoking a graphical function generates an implicit CALL event. This event can be used within the graphical function in temporal logic expressions as conditions for executing state or transition actions.

In a typical embodiment in a statechart system, the system's statechart editor will handle development of graphical functions in a chart. The inputs may be user keystrokes, mouse actions, files or other common input methods. The output is normally a statechart containing graphical function definitions and invocations of graphical functions. In the embodiment described, graphical functions use existing charting elements of an existing statechart system, e.g., blocks, labels, and flow diagrams. No special chart editing techniques are required to create graphical functions. A person skilled in the art of computer graphics can readily enhance a chart editor to support creation of graphical functions.

A statechart system's code generation subsystem handles conversion of graphical functions into generated code. The input to the code generation process is one or more charts containing graphical function definitions and invocations. The output may be in a high-level language code (such as C or other high level language) or if preferred, may be in assembly code or other lower level language that realizes the state machine represented by the charts. Graphical functions are usually represented by inline code or by the equivalent functional representations in the target language. For example, if the target language is C, graphical functions are translated into C functions in the generated code.

Code generation from a statechart typically occurs in three phases: parse, optimization, and synthesis. The following describes an exemplary implementation to handle statecharts containing graphical function definitions. Other implementations are, of course, possible.

Parse Phase: this phase accepts a chart as input and converts it to an intermediate representation (IR) that facilitates code generation in the final phase. Handling graphical functions in this phase requires adding a function definition parse phase at the beginning of the statechart parse phase. In this initial phase, the parser makes a pass through the statechart searching for graphical function definitions. For each definition, the system converts the graphical function to the intermediate representation for a function. In particular, the graphical function's prototype is converted to an IR function prototype and the graphical function's function graph is converted to IR code. If the function graph is a standard graph type of the charting system, no new programming is required to parse the function graph.

Once the initial graphical function definition parsing phase is completed, the statechart parser parsing proceeds in the usual manner, with one exception. Whenever the parser encounters a function invocation in a state or transition, it checks whether the function being invoked is a graphical function. If it is, the parser checks to ensure that the function invocation complies with applicable syntax rules.

Optimization Phase: When generating code, statechart systems typically look for opportunities to optimize the generated code. The performance of code generated from statecharts that use graphical functions can be improved by inlining the code generated for simple functions. Inlining is possible only if the function is never invoked recursively. Thus, the optimization phase must first determine for each graphical function whether it is directly or indirectly recursive. A function, F, is directly recursive if F invokes itself. F is indirectly recursive if F is invoked directly or indirectly by any function that F invokes. One method of determining if a graphical function is recursive is to construct the call graph for the function and examine the graph for cycles. If no cycles exist, the function is not recursive and can be inlined.

Even if a function can be inlined, it may not be desirable to inline it. Inlining presents a tradeoff between performance and footprint. Inlining functions increases the performance of the generated code but it also increases its read-only memory (ROM) requirements. Typically code generation systems handle this tradeoff by inlining only functions whose complexity is less than some predefined threshold. For example, one technique is to use the number of generated statements as a measure of complexity. Other well-known complexity measures can be used, such as ROM usage, RAM usage, or speed of execution, depending on the requirements of the system.

Synthesis Phase: The synthesis phase of code generation accepts the intermediate code representation as input and outputs code in a specified target language (e.g., C). Assuming that the IR used by the statechart system includes a scheme for representing functions, no special processing is necessary to handle graphical functions in this phase.

The following describes the declaration and use of graphical functions in an exemplary statechart system.

First determine one or more states in a model where it is desired that the function appear. A function can reside anywhere in a state diagram, either at the top level or within any state or subchart. The location of a function definition determines its scope, that is, the set of states and transitions that can invoke the function. In particular, the scope of a function is the scope of its parent state or chart, with two exceptions:

(i) a chart containing the function exports its graphical functions, in which case the scope of the function is the scope of its parent state machine; and (ii) (ii) a child of the function's parent defines a function of the same name, in which case the function defined in the parent is not visible anywhere in the child or its children. In other words, a function defined in a state or subchart shadows any functions of the same defined in the ancestors of that state or subchart.

Figure 5:
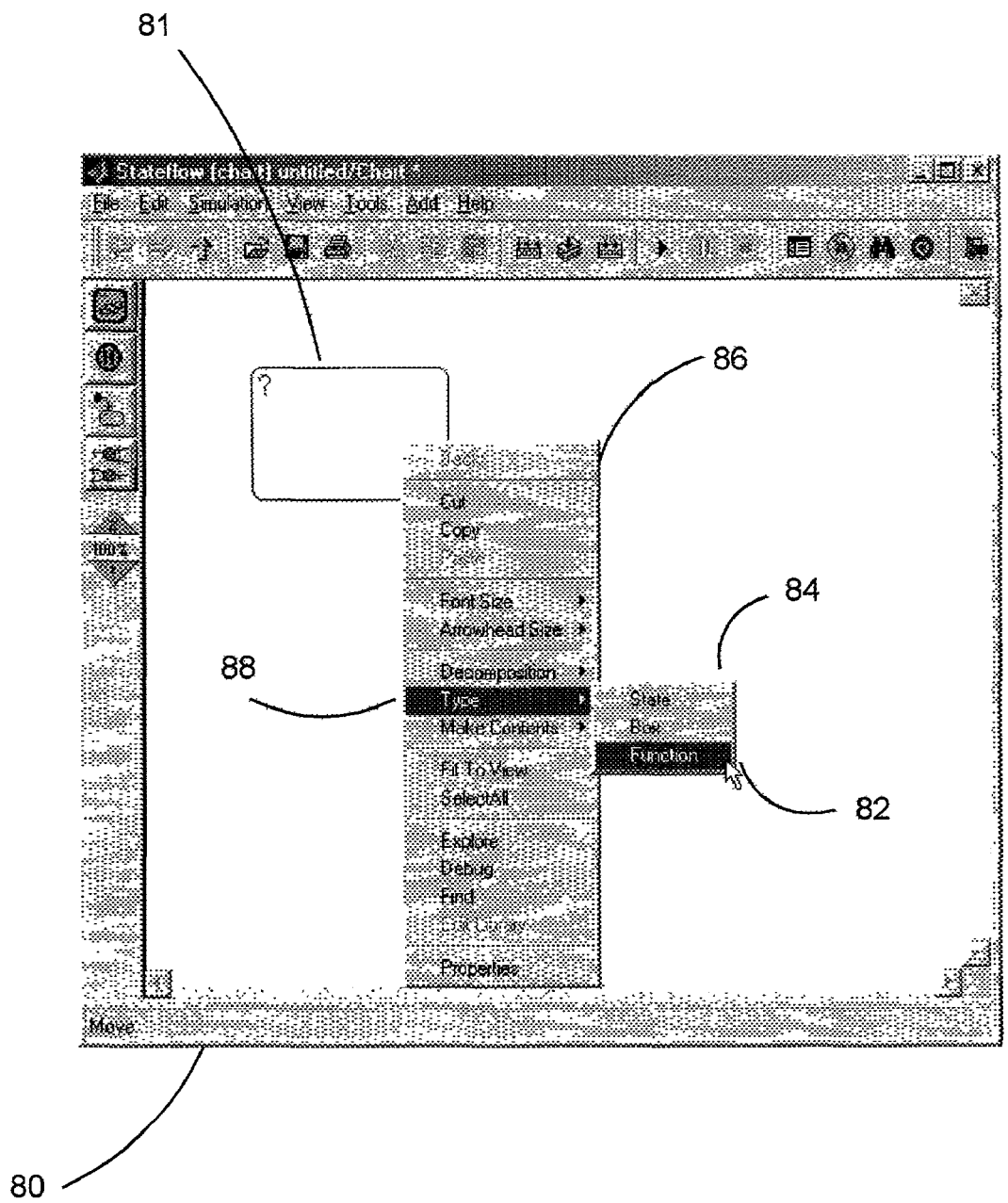
FIG. 5 is a view of an exemplary editing screen used to define a graphical function.

Referring to FIG. 5, an exemplary object definition screen 80 is shown. A blank and undefined object 81 is shown, with a shortcut menu 86. Selecting Function 82 from the Type 88 submenu 84 of the newly created state's 81 shortcut menu 86.

The undefined object is converted from a state to a graphical function.

Figure 6:
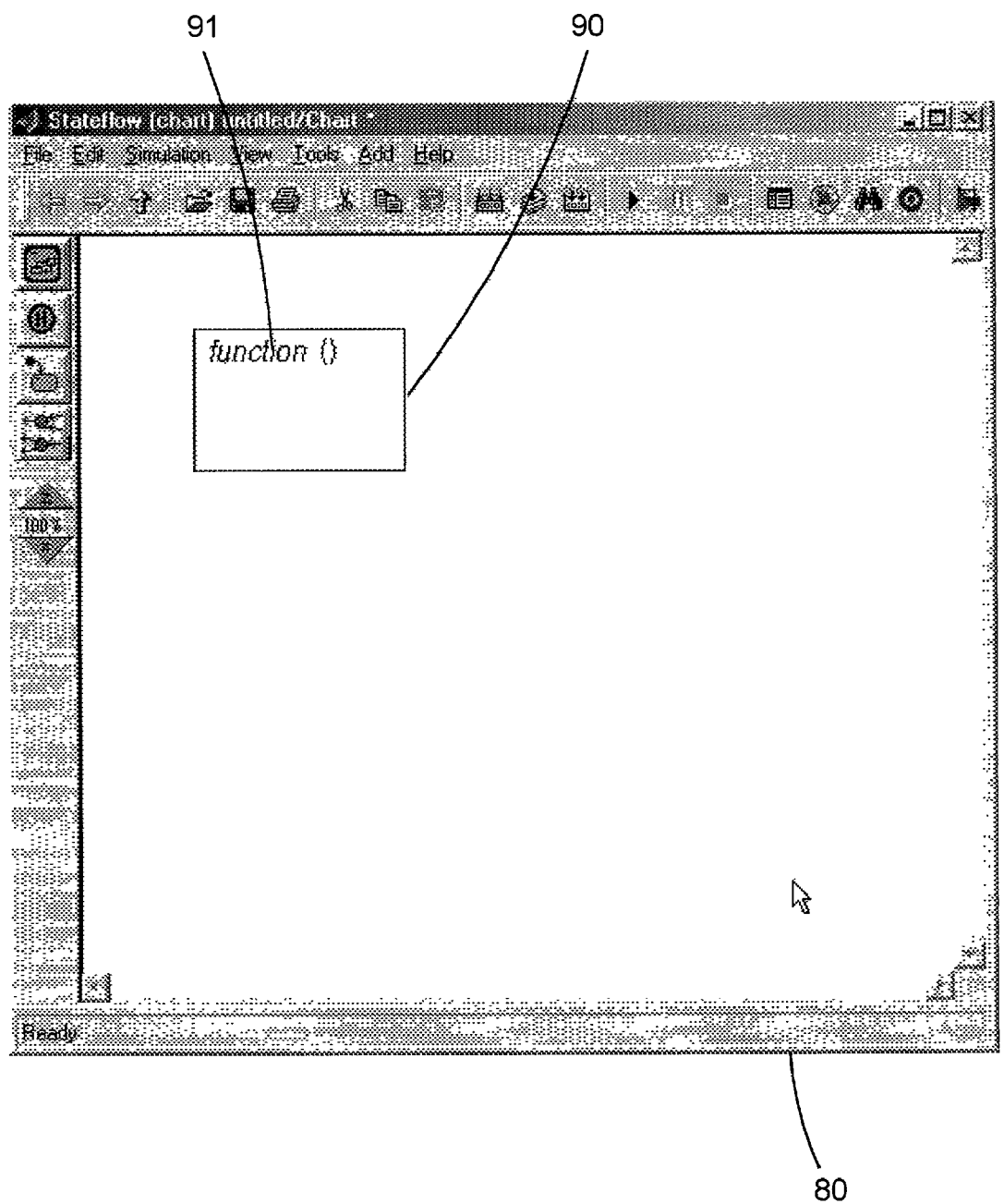
FIG. 6 is a view of an exemplary editing screen showing an empty graphical function shell definition.

Referring to FIG. 6, the selected function 90 appears as an unnamed object with a function label 91.

Figure 7:
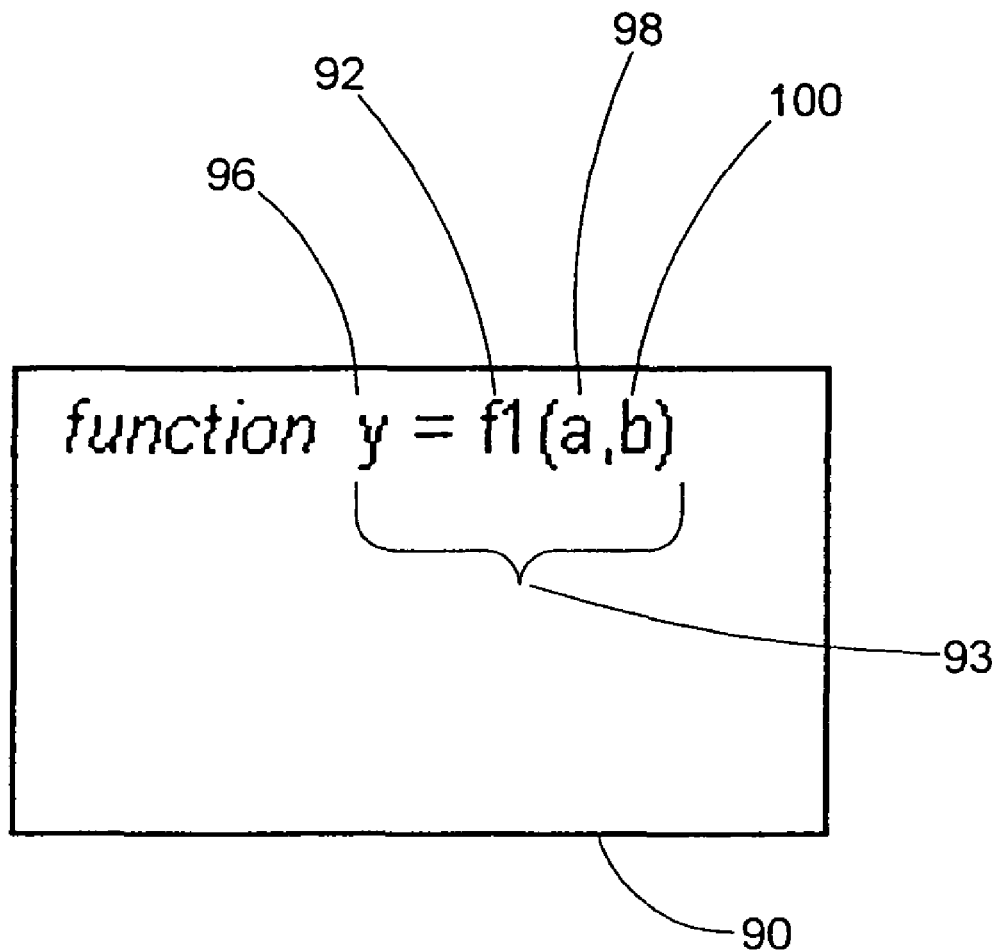
FIG. 7 is a view of a graphical function showing a function prototype.

Referring to FIG. 7, a function label 93 is shown wherein a user has entered a function prototype 92 in the function label 93. The function prototype specifies a name 92 for the function and formal names for its arguments 98, 100 and return value 96. A prototype has the syntax $$y=f(a_1, a_2, \ldots a_n)$$

where f is the function's name, $a_1$, $a_2$, an are formal names for its arguments, and y is the formal name for its return value.

Figure 8:
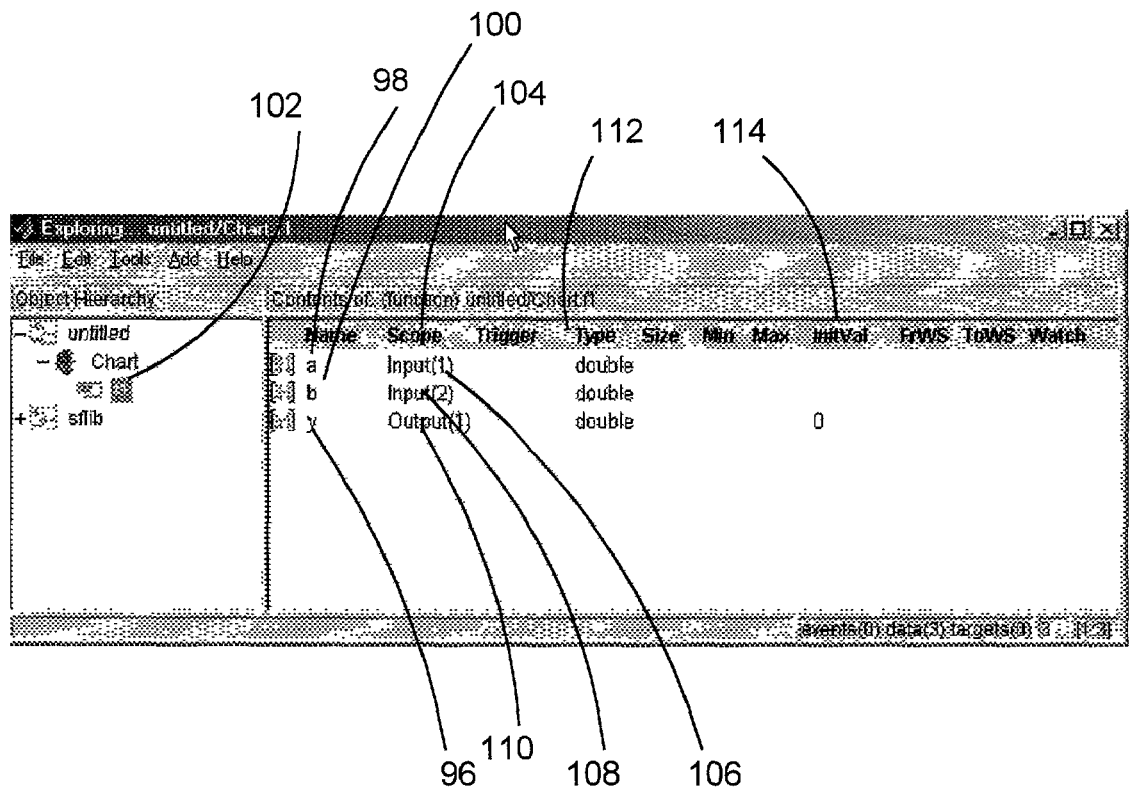
FIG. 8 is a view of an exemplary function argument attributes editing screen.

Referring to FIG. 8, the return value 96 and arguments 98 and 100 declared in the prototype are shown in a screen as data items parented by the function object 102.

The Scope field 104 indicates the role of the corresponding argument or return value. Arguments have scope Input 106, and 108. A return value has scope Output 110. The number that appears in parentheses for the scope of each argument is the order in which the argument appears in the function's prototype. When a graphical function is invoked, arguments are preferably passed to the function in the same order as the function prototype.

The term scope refers to the role (argument or return value) of the data items specified by the function's prototype. The term scope can also refer to a data item's visibility. In this sense, arguments and return values have local scope. They are visible only in the flow diagram that implements the function.

In the shown embodiment, one may use a graphics editor to change the prototype of a graphical function at any time. When done editing the prototype, the system updates the data dictionary to reflect the changes.

If desired, a user may specify other data properties such as data type 112 or initial value 114, etc. of the function's arguments and return values. Other data properties may be defined as desired.

The following restrictions preferably apply to argument and return value properties.

i. Arguments cannot have initial values.
ii. Arguments must have scope Input. Note that the data item property "Input scope" has different meanings in different contexts. In the context of a graphical function, "Input scope" simply means that the data item is a function argument.
iii. Return values must have scope Output. Note that the data property "Output scope" has different meanings in different contexts. In the context of a graphical function, "Output scope" simply means that the data item is a function return value.
iv. Arguments and return values cannot be referenced outside the graphical function.

A user defines any additional data items that the function may need to process when it is invoked.

A function must use a qualified name to access a data item that it does not own. The qualified name of a data item is the data item's name prepended with the names of the data item's owner and the ancestors of the owner. For example, suppose that data item x is owned by state B which is the child of state A and that state A is parented by the chart. Then the qualified name of x is A.B.x. A function may use unqualified names to access items that it owns. The items created can have any of local, temporary or constant scopes.

In the example embodiment shown, the flow diagram preferably includes a default transition terminated by a junction. FIG. 2 shows a minimal flow diagram 36 for a graphical function 32 that computes the product of its arguments 40 and 42. The transition may include any function elements that the system is capable of supporting, such as sine, cosine, statistical functions, complex functions and the like.

Any state or transition action that is in the scope of a graphical function can invoke that function. The invocation syntax is the same as that of the function prototype, with actual arguments replacing the formal parameters specified in the prototype. If the data types of the actual and formal argument differ, the exemplary embodiment casts the actual argument to the type of the formal parameter. FIG. 4, discussed above, shows an exemplary embodiment of a state entry action that invokes a function that returns the product of its arguments.

A number of embodiments of the invention have been described. Nevertheless, it will be understood that various modifications may be made without departing from the spirit and scope of the invention. For example, different graphical drawing schemes may be used to define graphical functions, and the scoping rules may be varied. Different data types may be used as well. Accordingly, other embodiments are within the scope of the following claims.

What is claimed is:

1. A computer-implemented method comprising:
providing a graphical user interface for defining a function to be used in a graphical representation of a finite state machine, where the graphical representation is an executable model of the finite state machine in a statechart system and includes at least one state and at least one transition;
representing the function graphically such that the function is graphically represented separately from the at least one state and at least one transition in the graphical representation of the finite state machine, wherein the function that is represented graphically has a function prototype that specifies a syntax for invoking the function, the function prototype specifying a function name for the function, and the function is defined in the statechart system in a graphical language; and
calling the function that is represented graphically by the function name according to the syntax specified by the function prototype from within the graphical representation of the finite state machine.

2. The method of claim 1 wherein the graphical function further includes a function block.

3. The method of claim 1 wherein the graphical function further includes a function flow diagram that graphically defines a procedure performed by the function.

4. A computer-implemented method, said method comprising:
providing a graphical user interface for defining a function to be used in a graphical representation of a finite state machine, where the graphical representation is an executable model of the finite state machine in a statechart system and includes at least one state and at least one transition;
representing the function graphically such that the function is graphically represented separately from the at least one state and the at least one transition in the graphical representation of the finite state machine,
wherein the function is represented graphically in the statechart system as a diagram comprising graphical elements and has a function prototype that specifies a syntax for invoking the function, the function prototype specifying a function name for the function; and
calling the function that is represented graphically by the function name according to the syntax specified by the function prototype from within the graphical representation of the finite state machine.

5. The method of claim 1 further comprising modifying the function through graphical diagramming.

6. A computer program product, stored in a computer readable storage medium, comprising instructions to cause a computer to:
receive input defining a graphical function for use in a finite state machine in a statechart system, the graphical function having a function prototype in the statechart system that specifies a syntax for invoking the graphical function, the function prototype specifying a function name for the graphical function; and
use the graphical function in a simulation of a system represented by the finite state machine, wherein the instructions to use the graphical function further comprise instructions to call the graphical function by the function name according to the syntax specified by the function prototype from at least one state or transition in the finite state machine, the graphical function being represented graphically such that the graphical function is graphically represented separately from the at least one state or transition in the finite state machine.

7. The computer program product of claim 6 wherein the input defining the graphical function is entered into a function block.

8. The computer program product of claim 6 wherein the input comprises a function flow diagram that graphically defines a procedure performed by the function.

9. The computer program product of claim 8 wherein the function flow diagram is comprised of graphical elements.

10. A system for modeling at least one finite state machine, said system comprising:
- a computer comprising a graphical user interface, a memory, a storage, and at least one input device;
- means to receive input to define a graphical function, the graphical function having a function prototype that specifies a syntax for invoking the graphical function, the function prototype specifying a function name for the graphical function;
- means to represent the graphical function as an executable state flow diagram in a statechart system; and
- means to call the graphical function by the function name according to the syntax specified by the function prototype from the at least one finite state machine in a simulation of the at least one finite state machine, the at least one finite state machine including at least one state and at least one transition, the graphical function being represented graphically such that the graphical function is graphically represented separately from the at least one state and the at least one transition in the finite state machine in the statechart system.

11. The system of claim 10 wherein the input to define the graphical function is entered into a function block.

12. The system of claim 10 wherein the input comprises a function flow diagram that graphically defines a procedure performed by the graphical function.

13. The system of claim 12 wherein the function flow diagram is comprised of graphical elements.

14. The system of claim 12 further comprising means for hiding the display of the function flow diagram based upon input.

15. A method of operating a data processing system having a graphical user interface, said method comprising:
- creating a graphical representation of a finite state machine and a graphical representation of a function for use in the graphical representation of the finite state machine in a statechart system, the function having a function prototype represented in the statechart system that specifies a syntax for invoking the function, the function prototype specifying a function name for the function, the graphical representation of the finite state machine including at least one state and at least one transition, the graphical representation of the function being represented graphically such that the function is graphically represented separately from the at least one state and the at least one transition in the graphical representation of the finite state machine;
- simulating a system represented by the finite state machine in the statechart system, wherein the graphical representation of the finite state machine is an executable model of the system; and
- calling the function by the function name according to the syntax specified by the function prototype from the executable model of the system during the act of simulating the system represented by the finite state machine.

16. The method of claim 15 further comprising shadowing the function, wherein shadowing comprises using in a function invocation a function definition closest to a point of invocation of the function in a state diagram hierarchy.

17. The method of claim 15 wherein the function is exportable by a state chart and may be invoked anywhere in the finite state machine in which the chart appears, including other charts that define the finite state machine.

18. The method of claim 15 wherein simulating the system represented by the finite state machine further comprises computer code generation.

19. A computer readable storage medium having encoded thereon:
- instructions for causing a computer system to receive through a graphical user interface a graphical representation of a finite state machine for use in a statechart system and a graphical representation of a function for use in the graphical representation of the finite state machine, the function having a function prototype that is represented in the statechart system that specifies a syntax for invoking the function, the function prototype specifying a function name for the function, the graphical representation of the finite state machine including at least one state and at least one transition, the function being represented graphically such that the function is graphically represented separately from the at least one state and the at least one transition in the graphical representation of the finite state machine; and
- instructions for simulating a system represented by the finite state machine, where the graphical representation of the finite state machine is an executable model of the system; and
- instructions for calling the function by the function name according to the syntax specified in the function prototype from at least one place in the executable model during the system simulation.

20. In an electronic device, a method of graphically representing an event-driven system, said method comprising:
- providing one or more block components representing one or more states in an executable model in a event-driven system modeling environment;
- providing one or more transition components representing transitions between the one or more states; and
- providing a function having a function prototype that specifies a syntax for invoking the function, the function prototype specifying a function name for the function, said function comprising at least two graphical components in the event driven-system modeling environment and being referenced by at least one of the states or at least one of the transitions to call the function by the function name according to the syntax specified by the function prototype at the at least one of the states or the at least one of the transitions, the function being represented graphically such that the function is graphically represented separately from the at least one of the states and the at least one of the transitions in the executable model.

21. The method of claim 20, wherein the function accepts at least one argument and returns at least one result.

22. The method of claim 20, further comprising invoking the function at a second one of the one or more transition components or one or more block components.

23. The method of claim 20, further comprising specifying data properties of the function.

24. The method of claim 20, further comprising associating a data item with the function.

25. The method of claim 20, wherein the function comprises a graphical function.

26. The method of claim 20, wherein the function has a plurality of configurable properties.

27. The method of claim 20, further comprising providing a shadowing function, wherein shadowing comprises using in a function invocation a function definition proximally closest to a point of invocation of the function in a state diagram hierarchy.

28. In a graphical representation environment, a system for graphically representing an event-driven system, said system comprising:
  one or more block components representing one or more states in an executable model in an event-driven system environment;
  one or more transition components representing transitions between the one or more block components representing the one or more states; and
  a component representing a graphical function having a function prototype that specifies a syntax for invoking the function, the function prototype represented in the event-driven system environment and specifying a function name for the graphical function, and referenced by at least one of the states or at least one of the transitions to call the graphical function by the function name according to the syntax specified by the function prototype at one of the states or one of the transitions, the graphical function being represented graphically such that the graphical function is graphically represented separately from the at least one of the states and the at least one of the transitions in the executable model.

29. The system of claim 28, wherein the graphical function accepts at least one argument and returns at least one result.

30. The system of claim 28, wherein at least a subset of the one or more block components representing the states and the one or more transition components can invoke the graphical function.

31. The system of claim 28, further comprising means for specifying data properties of the graphical function.

32. The system of claim 28, further comprising means for associating a data item with the graphical function.

33. The system of claim 28, wherein the component representing the graphical function is referenced by one more of: at least one of the states or at least one of the transitions.

34. The system of claim 28, wherein the graphical function has a plurality of configurable properties.

35. The system of claim 28, further comprising means for providing a shadowing function, wherein shadowing comprises using in a function invocation a function definition proximally closest to a point of invocation of the function in a state diagram hierarchy.

36. A computer-readable storage medium for use in a graphical representation environment on an electronic device, the medium holding instructions executable using the electronic device for graphically representing an event-driven system, said instructions comprising instructions for:
  providing one or more block components representing one or more states in an executable model in an event-driven system environment;
  providing one or more transition components representing transitions between the one or more block components representing the one or more states; and
  providing a block component in the event-driven system environment representing a graphical function defined in the event-driven system environment having a function prototype that specifies a syntax for invoking the graphical function, the function prototype specifying a function name for the graphical function and referenced by at least one of the states or at least one of the transitions to call the graphical function by the function name according to the syntax specified by the function prototype at one of the states or one of the transitions during execution of the event-driven system, the graphical function being represented graphically such that the graphical function is graphically represented separately from the at least one of the states and the at least one of the transitions in the executable model.

37. The computer-readable storage medium of claim 36, wherein the graphical function accepts at least one argument and returns at least one result.

38. The computer-readable storage medium of claim 36, wherein the one or more transition components can invoke the graphical function.

39. The computer-readable storage medium of claim 36, further comprising instructions for accepting input specifying data properties of the graphical function.

40. The computer-readable storage medium of claim 36, further comprising instructions for associating a data item with the graphical function.

41. The computer-readable storage medium of claim 36, wherein the graphical function comprises two or more graphical elements.

42. The computer-readable storage medium of claim 36, wherein the graphical function has a plurality of configurable properties.

43. The computer-readable storage medium of claim 36 further comprising instructions for providing a shadowing function, wherein shadowing comprises using in a function invocation a function definition proximally closest to a point of invocation of the graphical function in a state diagram hierarchy.

44. A computer-implemented method for modeling a system using a graphical block diagram environment, said method comprising:
  graphically representing a function defined in the graphical block diagram environment having a function prototype that specifies a syntax for invoking the function, the function prototype specifying a function name for the function for use in an executable model within the graphical block diagram environment, the executable model including at least one state and at least one transition, the function being represented graphically such that the function is graphically represented separately from the at least one state and the at least one transition in the executable model; and
  textually referencing the graphically represented function by the function name according to the syntax specified by the function prototype within the model to cause an invocation of the graphically represented function during execution of the model.

45. The computer-implemented method of claim 44, wherein the model is represented as a finite state machine.

46. The computer-implemented method of claim 45, wherein the finite state machine is a hierarchical finite state machine.

47. The computer-implemented method of claim 45 further comprising:
  associating the graphically represented function with at least one state or transition within the finite state machine.

48. The computer-implemented method of claim 44, wherein the graphically represented function is represented as at least one of a finite state machine, a state flow diagram, a function flow diagram, and a graphical block diagram model.

49. A computer-readable storage medium holding instructions executable using an electronic device for modeling a system using a graphical block diagram environment, said instructions comprising instructions for:
  graphically defining a function in the graphical block diagram environment having a function prototype that specifies a syntax for invoking the function, the function prototype specifying a function name for the function for use in an executable model within the graphical block diagram environment, the executable model including at least one state and at least one transition, the function being represented graphically such that the function is graphically represented separately from the at least one state and the at least one transition in an executable model; and textually referencing the graphically represented function by the function name according to the syntax specified by the function prototype within the model to cause an invocation of the graphically represented function during execution of the model.

50. The computer-readable storage medium of claim 49, wherein the model is represented as a finite state machine.

51. The computer-readable storage medium of claim 50 further comprising instructions for:

associating the graphically represented function with at least one state or transition within the finite state machine.

52. The computer-readable storage medium of claim 49, wherein the graphically represented function is represented as at least one or a combination of: a finite state machine, a state flow diagram, a function flow diagram, and a graphical block diagram model.

53. A computer-implemented system for modeling using a graphical block diagram environment, said system comprising:

means for representing a function defined in the graphical block diagram environment having a function prototype that specifies a syntax for invoking the function, the function prototype specifying a function name for the function, the function being defined graphically for use in an executable model within the graphical block diagram environment, the executable model including at least one state and at least one transition, the function being represented graphically such that the function is graphically represented separately from the at least one state and the at least one transition in the executable model; and means for textually referencing the function defined graphically by the function name according to the syntax specified by the function prototype within the model to cause an invocation of the function during execution of the model.

54. The system of claim 53, wherein the executable model is represented as a finite state machine.

55. The system of claim 54 further comprising:

means for associating the graphically represented function with at least one state or transition within the finite state machine.

56. The system of claim 53, wherein the graphically represented function is represented as at least one or a combination of a finite state machine, a state flow diagram, a function flow diagram, and a graphical block diagram model.

57. A graphical block diagram modeling system comprising:

a graphical function for use in an executable model in a graphical block diagram modeling environment, the graphical function having a function prototype that specifies a syntax for invoking the graphical function, the function prototype specifying a function name for the graphical function, wherein at least a subset of commands of the graphical function are defined through a graphical representation in the graphical block diagram modeling environment, the executable model including at least one state and at least one transition, the graphical function being represented graphically such that the graphical function is graphically represented separately from the at least one state and the at least one transition in the executable model; and a graphical representation of the model including a textual reference of the graphical function by the function name according to the syntax specified by the function prototype within the graphical representation of the model to cause an invocation of the graphical function during an execution of the model.

58. The system of claim 57, wherein the model is represented as a finite state machine.

59. The system of claim 58, wherein the finite state machine is a hierarchical finite state machine.

60. The system of claim 58, wherein the finite state machine further comprises:

at least one state or transition associated with the graphical function.

61. The system of claim 57, wherein the graphical function is represented as at least one or a combination of: a finite state machine, a state flow diagram, a function flow diagram, and a graphical block diagram model.

* * * * *

UNITED STATES PATENT AND TRADEMARK OFFICE
CERTIFICATE OF CORRECTION

PATENT NO. : 7,720,656 B2  
APPLICATION NO. : 09/855199  
DATED : May 18, 2010  
INVENTOR(S) : Vijay Raghavan et al.

Page 1 of 1

It is certified that error appears in the above-identified patent and that said Letters Patent is hereby corrected as shown below:

On the Title Page, Item (73) Assignee, replace "The Math Works, Inc." with --The MathWorks, Inc.--.

Signed and Sealed this  
Twenty-fifth Day of November, 2014

Michelle K. Lee  
*Deputy Director of the United States Patent and Trademark Office*